US010946729B2

(12) United States Patent
Kang

(10) Patent No.: US 10,946,729 B2
(45) Date of Patent: *Mar. 16, 2021

(54) APPARATUS FOR VARYING TRANSPARENCY OF WINDOW GLASS USING WIRELESS POWER TRANSFER

(71) Applicants: Hyundai Motor Company, Seoul (KR); Kia Motors Corporation, Seoul (KR)

(72) Inventor: Kwan Hui Kang, Hwaseong-Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 230 days.

This patent is subject to a terminal disclaimer.

(21) Appl. No.: 16/007,013

(22) Filed: Jun. 13, 2018

(65) Prior Publication Data

US 2019/0176582 A1    Jun. 13, 2019

(30) Foreign Application Priority Data

Dec. 12, 2017    (KR) ........................ 10-2017-0170478

(51) Int. Cl.
*B60J 3/04*    (2006.01)
*B60R 16/03*    (2006.01)
(Continued)

(52) U.S. Cl.
CPC ................. *B60J 3/04* (2013.01); *B60R 16/03* (2013.01); *G02F 1/0121* (2013.01); *H02J 50/10* (2016.02); *B60J 1/17* (2013.01); *H01F 38/14* (2013.01)

(58) Field of Classification Search
CPC ..... B60J 3/04; B60J 1/17; H02J 50/10; B60R 16/03
See application file for complete search history.

(56) References Cited

U.S. PATENT DOCUMENTS 10,654,343 B2 *  5/2020  Kang ..................... H02J 50/80
2012/0200150 A1 *  8/2012  Urano ..................... B60L 53/36
                                                               307/9.1

(Continued)

FOREIGN PATENT DOCUMENTS

FR          2989319 A1    10/2013
JP       2010132142 A     6/2010
(Continued)

OTHER PUBLICATIONS

European Search Report for European Patent Application No. 18178385.3, dated Dec. 20, 2018, 11 pages.

*Primary Examiner* — Christopher E Mahoney
(74) *Attorney, Agent, or Firm* — Mintz Levin Cohn Ferris Glovsky and Popeo, P.C.; Peter F. Corless

(57) ABSTRACT

An apparatus for varying the transparency of a window glass can include: a window glass having a film with variable transparency; a pair of electrodes connected to the film; a controller mounted on a vehicle door of a vehicle, the controller controlling a wireless transfer of power for adjusting the transparency of the film; and a wireless power receiver mounted on the window glass, the wireless power receiver wirelessly receiving the power from the controller. The wireless power receiver can apply the power wirelessly received from the controller to the pair of electrodes.

11 Claims, 14 Drawing Sheets

(51) Int. Cl.
    *H02J 50/10*     (2016.01)
    *G02F 1/01*     (2006.01)
    *H01F 38/14*     (2006.01)
    *B60J 1/17*     (2006.01)

(56) References Cited

U.S. PATENT DOCUMENTS

| | | |
|---|---|---|
| 2013/0050797 A1 | 2/2013 | Takahashi et al. |
| 2013/0221744 A1* | 8/2013 | Hall .................. H02J 7/0047 307/9.1 |
| 2014/0247473 A1 | 9/2014 | Kuhnen et al. |
| 2015/0103280 A1 | 4/2015 | Wang |
| 2018/0015282 A1* | 1/2018 | Waner .................. A61N 1/3601 |
| 2018/0093611 A1* | 4/2018 | Kim ...................... B60K 37/06 |
| 2018/0095586 A1* | 4/2018 | Cho ....................... G06F 3/044 |

FOREIGN PATENT DOCUMENTS

| | | |
|---|---|---|
| JP | 2010224968 A | 10/2010 |
| JP | 2011111143 A | 6/2011 |
| KR | 10-1531728 B1 | 6/2015 |
| KR | 101730155 B1 | 4/2017 |
| KR | 2019-0070026 A | 6/2019 |

\* cited by examiner

APPARATUS FOR VARYING TRANSPARENCY OF WINDOW GLASS USING WIRELESS POWER TRANSFER

CROSS-REFERENCE TO RELATED APPLICATION

This application is based on and claims the benefit of priority to Korean Patent Application No. 10-2017-0170478, filed on Dec. 12, 2017 in the Korean Intellectual Property Office, the disclosure of which is incorporated herein in its entirety by reference.

TECHNICAL FIELD

The present disclosure relates to an apparatus for varying the transparency of a window glass and, more particularly, to an apparatus for varying the transparency of a window glass using wireless power transfer.

BACKGROUND

Most vehicle doors are provided with a window regulator that moves a window glass (i.e., window) up and down. The window regulator may be integrated into a door module mounted in the vehicle door, or directly mounted on an inner panel of the vehicle door. Here, the door module can refer to a module in which a latch, the window regulator, and related components are integrated.

In recent years, devices for varying the transparency of the window glass in the vehicle door have been developed. By varying the degree of transparency, the window glass may function as a light screen or curtain.

Such a device includes a window glass having a variable transparency and a controller controlling the transparency of the window glass. The controller may receive electric power through electrical wiring, and facilitate the up and down movement of the window glass by giving the wiring sufficient clearance to correspond to a movement distance of the window glass.

Problematically, a conventional device for varying the transparency of a window glass may have disadvantages in that the clearance of the wiring may generate excessive noise when the door is opened and closed. Also, an overload may occur in a connector of the controller as the wiring becomes strained as the window glass is raised.

In addition, the assembly process of the above conventional device may be complicated and inefficient. For instance, after the window regulator is assembled in the vehicle door, the window glass may be assembled with the window regulator, and then the connector may be connected to the controller through a narrow gap in the vehicle door.

SUMMARY

The present disclosure has been made to solve the above-mentioned problems occurring in the related art while advantages achieved by the related art are maintained intact.

An aspect of the present disclosure provides an apparatus for varying the transparency of a window glass using wireless power transfer.

According to embodiments of the present disclosure, an apparatus for varying the transparency of a window glass may include: a window glass having a film with variable transparency; a pair of electrodes connected to the film; a controller mounted on a vehicle door of a vehicle, the controller controlling a wireless transfer of power for adjusting the transparency of the film; and a wireless power receiver mounted on the window glass, the wireless power receiver wirelessly receiving the power from the controller. The wireless power receiver can apply the power wirelessly received from the controller to the pair of electrodes.

The window glass may include an outdoor glass layer facing an outside of the vehicle and an indoor glass layer facing an interior of the vehicle, and the film may be disposed between the outdoor glass layer and the indoor glass layer.

The outdoor glass layer and the indoor glass layer may be attached to opposing surfaces of the film.

The pair of electrodes may be individually connected to the wireless power receiver through a pair of lead wires.

The controller may include an alternating current (AC) inverter circuit converting direct current (DC) power supplied from a battery into AC power required for power transmission, and a transmitting coil wirelessly transmitting the power to the wireless power receiver by electromagnetic induction.

The controller may further include a power transmission control module controlling an operation of the AC inverter circuit and a power level to be output from the AC inverter circuit according to a transparency control signal.

The wireless power receiver may be connected to a bottom end of the window glass.

The wireless power receiver may include a receiving coil wirelessly receiving the power from the power transmission control module by electromagnetic induction.

The receiving coil and the pair of electrodes may be electrically connected through lead wires.

The power transmission control module may determine whether or not the window glass is closed.

The wireless power receiver may include a glass position transmitter, and the glass position transmitter may feed a control signal received from the power transmission control module back to the power transmission control module.

The power transmission control module may determine whether or not the window glass is closed based on information indicating a position of the window glass received from a controller of a window regulator.

The controller may be connected to a window manipulation device having a transparency manipulation button.

BRIEF DESCRIPTION OF THE DRAWINGS

The above and other objects, features and advantages of the present disclosure will be more apparent from the following detailed description taken in conjunction with the accompanying drawings.

Figure 1:
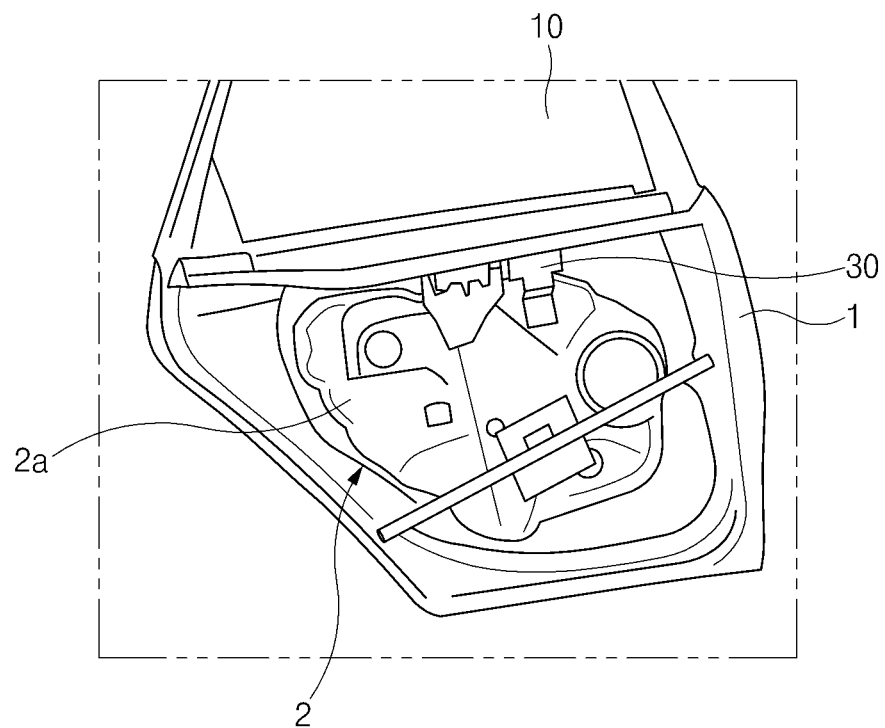
FIG. 1 illustrates a perspective view of a structure in which an apparatus for varying the transparency of a window glass according to embodiments of the present disclosure is applied to a vehicle door.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Figure 12:
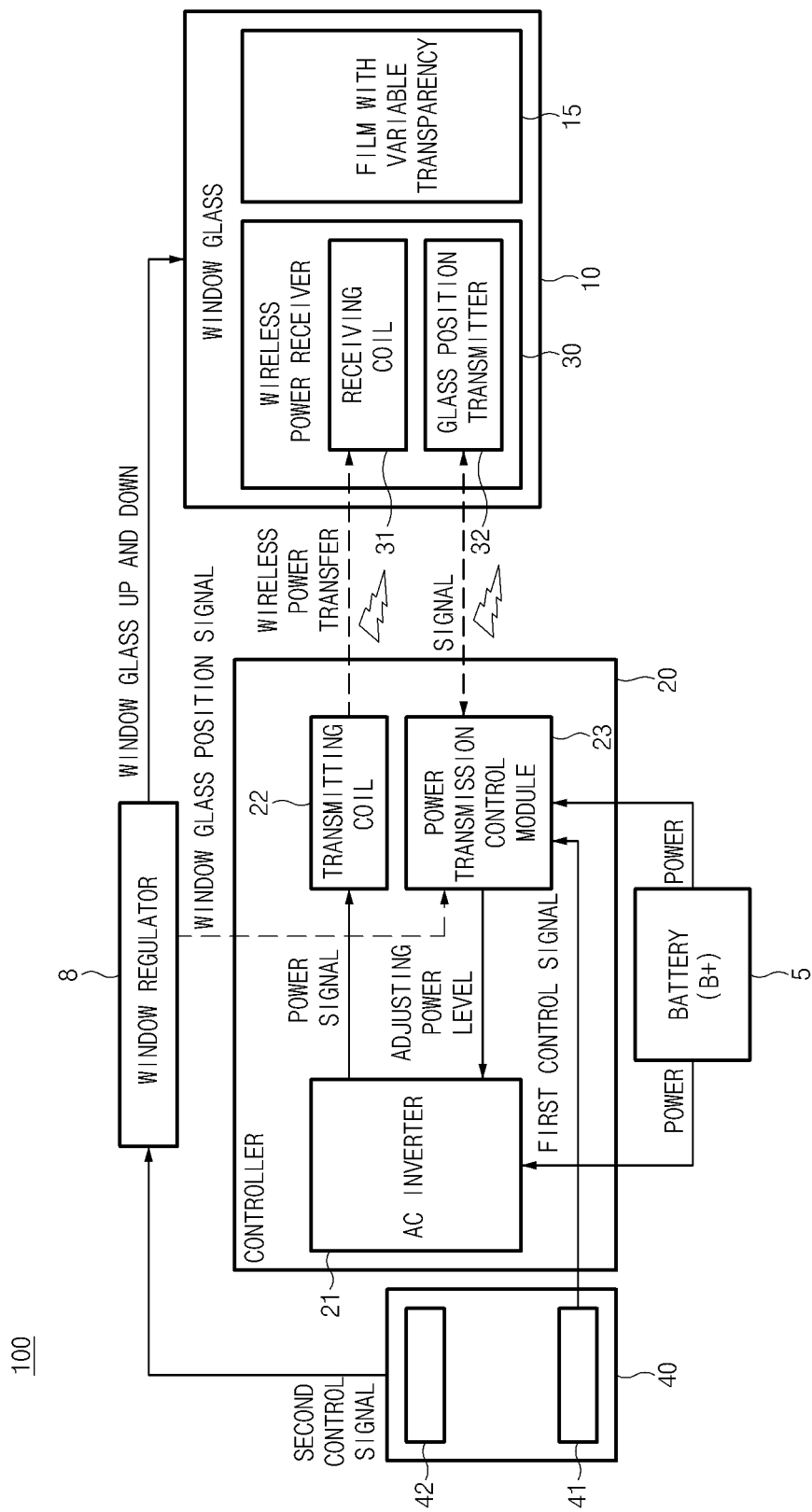
FIG. 12 illustrates a block diagram of an apparatus for varying the transparency of a window glass according to embodiments of the present disclosure.

Referring now to FIGS. 1 and 12, a vehicle door 1 may include a window glass 10 and a window regulator 8 for raising and lowering the window glass 10. The window glass 10 may be moved by the window regulator 8 between a fully closed position and a fully opened position. The fully closed position refers to a position at which the window glass 10 fully closes an opening of the vehicle door 1, and the fully opened position refers to a position at which the window glass 10 fully opens the opening of the vehicle door 1.

Figure 2:
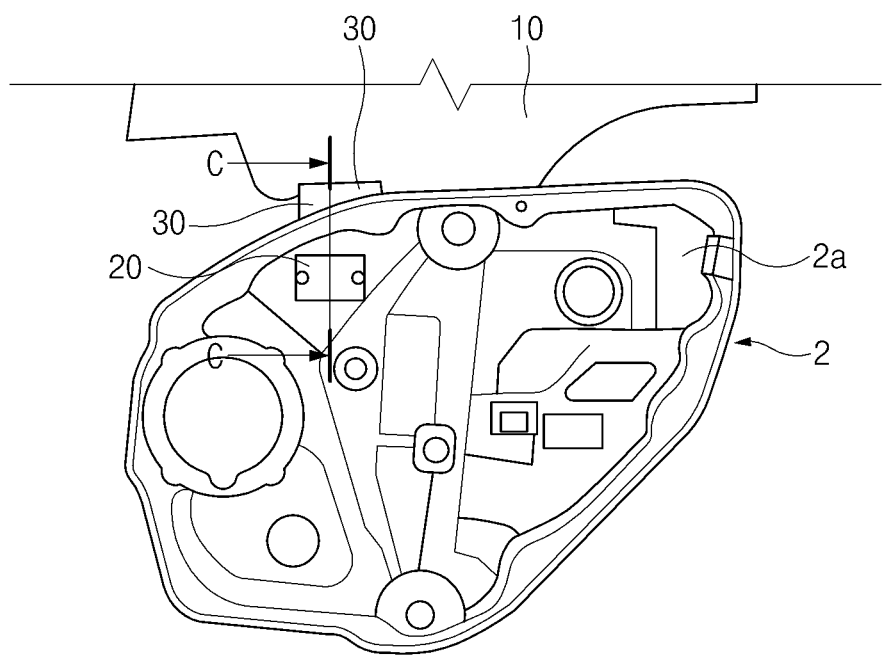
FIG. 2 illustrates an apparatus for varying the transparency of a window glass according to embodiments of the present disclosure.

According to embodiments of the present disclosure, as illustrated in FIGS. 1 and 2, the window regulator 8 (e.g., see FIG. 12) may be integrated into a door module 2, and the door module 2 may be mounted in the interior space of the vehicle door. The door module 2 may include a door module housing 2a, and the window regulator 8, a latch mechanism (not shown), and the like may be mounted inside the door module housing 2a. The door module housing 2a may be made of a non-conductive material such as synthetic resin.

Referring to FIG. 2, an apparatus 100 for varying the transparency of a window glass, according to embodiments of the present disclosure, may include the window glass 10 having a film 15 with variable transparency, a controller 20 mounted on the vehicle door 1, a wireless power receiver 30 mounted on the window glass 10, and a window manipulation device 40 connected to the controller 20.

Figure 3:
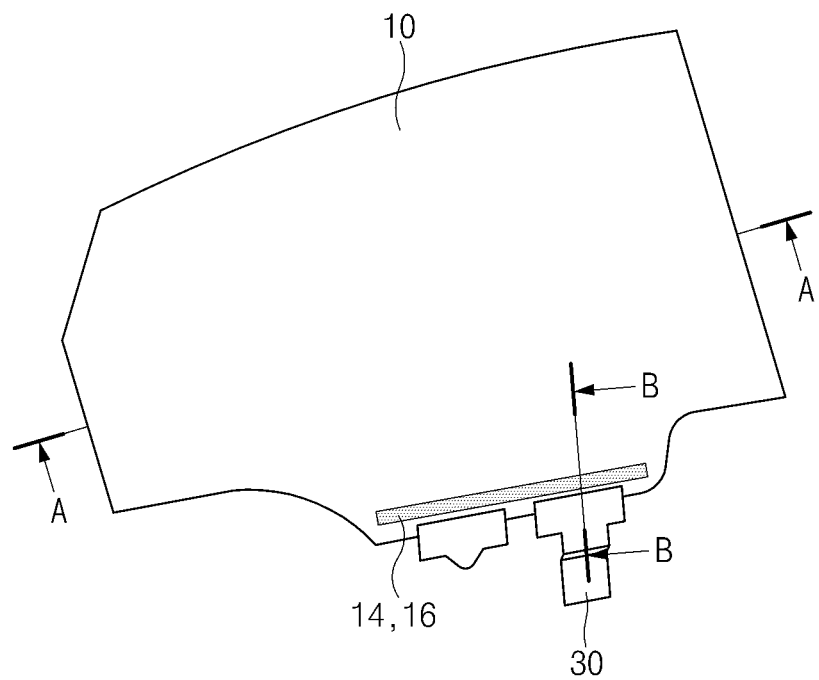
FIG. 3 illustrates a window glass and a wireless power receiver in an apparatus for varying the transparency of a window glass according to embodiments of the present disclosure.
Figure 4:
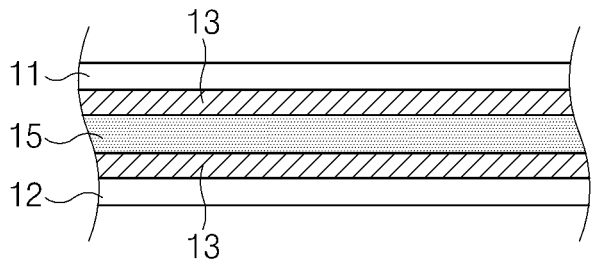
FIG. 4 illustrates a cross-sectional view taken along line A-A of FIG. 3.
Figure 5:
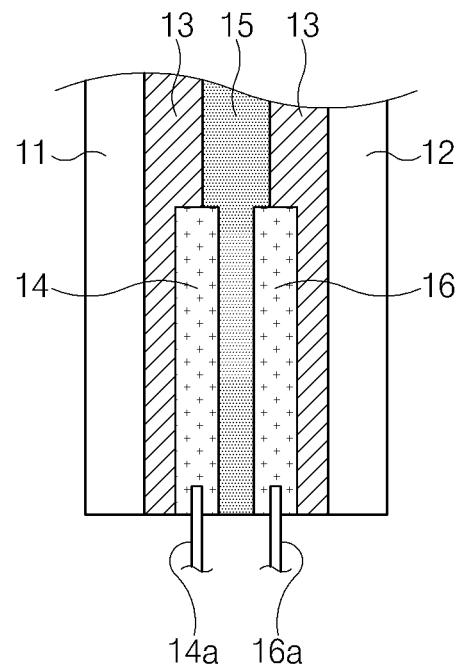
FIG. 5 illustrates a cross-sectional view taken along line B-B of FIG. 3.

As illustrated in FIGS. 3 to 5, the window glass 10 may include an outdoor glass layer 11 facing the outside of the vehicle, an indoor glass layer 12 facing the interior of the vehicle, and the film 15 with variable transparency disposed between the outdoor glass layer 11 and the indoor glass layer 12.

The outdoor glass layer 11 and the indoor glass layer 12 may be made of a transparent or translucent material, and the outdoor glass layer 11 and the indoor glass layer 12 may be attached to opposing surfaces of the film 15.

According to embodiments of the present disclosure, the outdoor glass layer 11 and the indoor glass layer 12 may be attached to the opposing surfaces of the film 15 using an adhesive layer 13. The adhesive layer 13 may be formed by applying a transparent adhesive to the entire surface of the film 15 or applying a transparent adhesive to edges of the film 15.

In addition, according to embodiments of the present disclosure, when the film 15 with variable transparency is made of a material having adhesiveness, the outdoor glass layer 11 and the indoor glass layer 12 may be attached to the opposing surfaces of the film 15 without the use of an adhesive. Alternatively, the outdoor glass layer 11 and the indoor glass layer 12 may be attached to the opposing surfaces of the film 15 by various methods with static cling, surface tension, or the like, without the use of an adhesive.

According to embodiments of the present disclosure, the film 15 with variable transparency may remain opaque when no electric power is applied, and may become transparent when electric power is applied. When an alternating current (AC) voltage higher than or equal to a predetermined voltage is applied to the film 15 with variable transparency, the arrangement of molecules constituting the film 15 may change so that light transmittance may be altered. The light transmittance of the film 15 with variable transparency may vary according to voltage levels. As the AC voltage increases, a variation in light transmittance may increase. However, when the applied voltage reaches a saturation point, the light transmittance may not change any more.

In addition, according to embodiments of the present disclosure, the film 15 with variable transparency may remain transparent when no electric power is applied, and may become opaque when electric power is applied.

The window glass 10 may include a pair of electrodes 14 and 16 electrically connected to the film 15 with variable transparency. Here, the pair of electrodes 14 and 16 may be a positive electrode 14 and a negative electrode 16.

The pair of electrodes 14 and 16 may be disposed adjacent to the wireless power receiver 30, and the pair of electrodes 14 and 16 may be individually connected to the wireless power receiver 30 through a pair of lead wires 14a and 16a.

The controller 20 may control wireless transfer of power for adjusting the transparency of the film 15 of the window glass 10.

Figure 6:
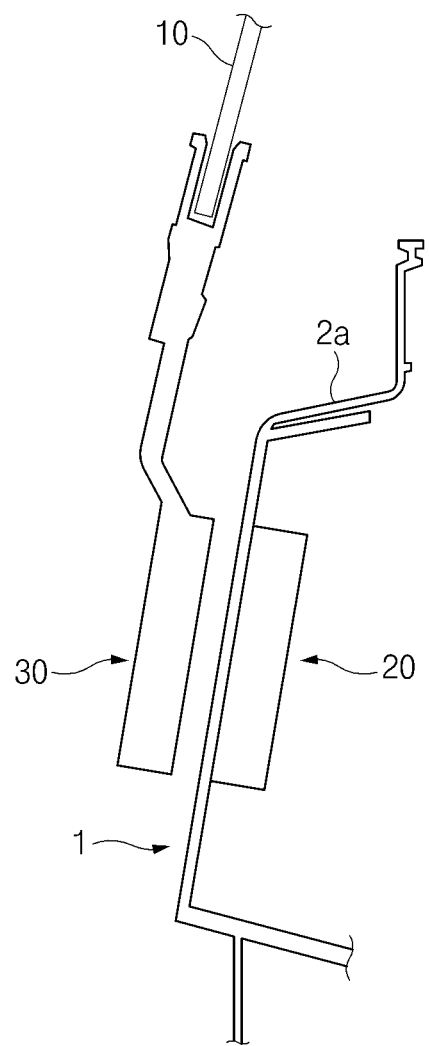
FIG. 6 illustrates a cross-sectional view taken along line C-C of FIG. 2.

According to embodiments of the present disclosure, the controller 20 may be mounted in the interior space of the door module housing 2a of the door module 2 as illustrated in FIGS. 2 and 6, and the door module housing 2a may be made of a non-conductive material such as synthetic resin. When the window glass 10 is moved to the fully closed position, the wireless power receiver 30 and the controller 20 may face each other as illustrated in FIG. 6.

Figure 7:
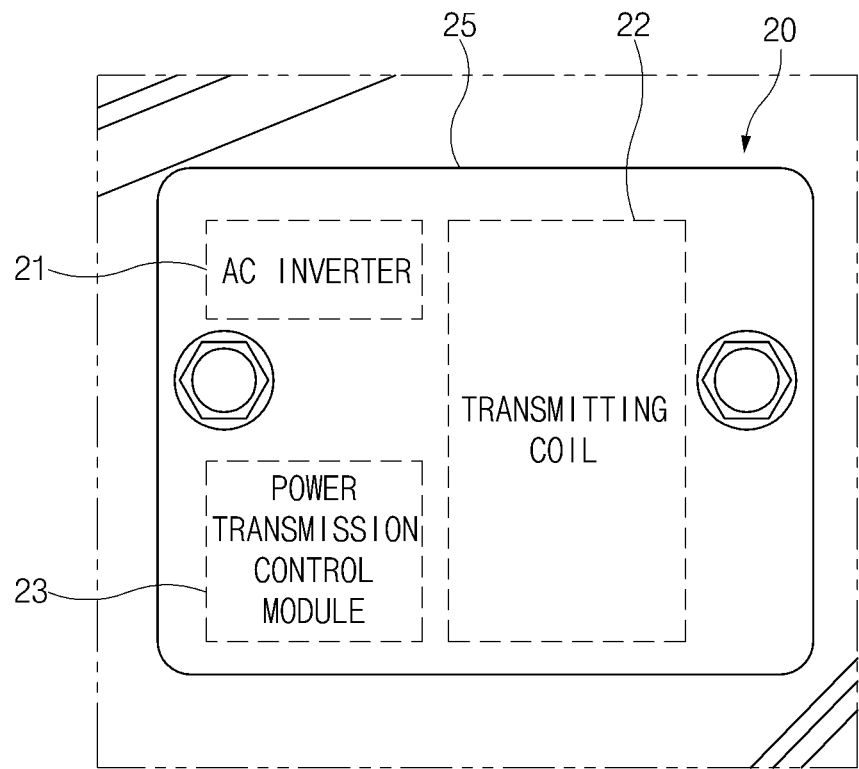
FIG. 7 illustrates a controller in an apparatus for varying the transparency of a window glass according to embodiments of the present disclosure.

As illustrated in FIG. 7, the controller 20 may include a substrate 25, an AC inverter circuit 21, a transmitting coil 22, and a power transmission control module 23.

The substrate 25 may be mounted in the door module housing 2a of the door module 2 using fasteners or the like, and the AC inverter circuit 21, the transmitting coil 22, and the power transmission control module 23 may be arranged on the substrate 25.

The AC inverter circuit 21 may convert direct current (DC) power supplied from a battery 5 into AC power required for power transmission.

The transmitting coil 22 may transmit the power to the wireless power receiver 30 wirelessly by electromagnetic induction.

The power transmission control module 23 may receive a first control signal for varying the transparency of the window glass 10, and the first control signal may be generated by operating a transparency manipulation button 42 of the window manipulation device 40. The power transmission control module 23 may control the operation of the AC inverter circuit 21 and a power level to be output from the AC inverter circuit 21 according to the received transparency control signal. For example, the power transmission control module 23 may adjust an amplitude of AC voltage output from the AC inverter circuit 21 according to the transparency control signal to thereby control the output power level of the AC inverter circuit 21.

When receiving the first control signal, the power transmission control module 23 may determine whether the window glass 10 is fully closed on the basis of control signal strength feedback from a glass position transmitter 32 to be described later.

As illustrated in FIG. 12, the AC inverter circuit 21 and the power transmission control module 23 may be electrically connected to the battery 5.

Figure 8:
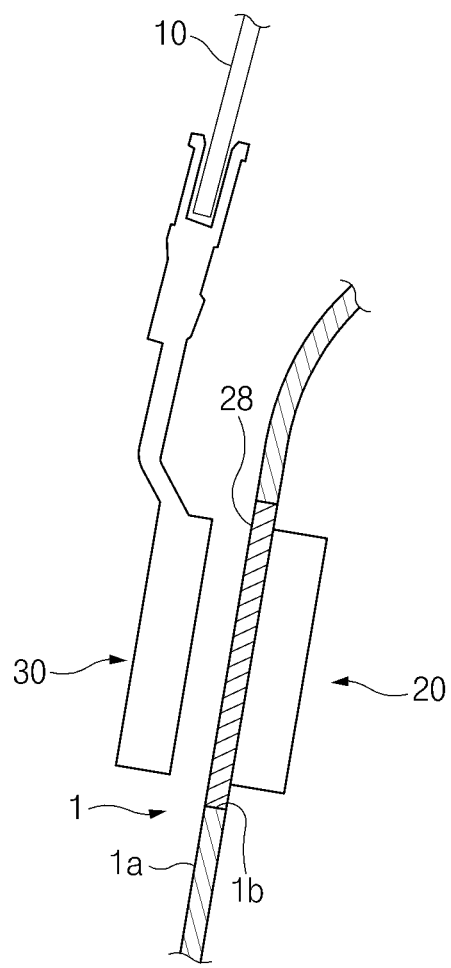
FIG. 8 illustrates an additional structure in which a controller in an apparatus for varying the transparency of a window glass according to embodiments of the present disclosure is mounted on an inner panel of a vehicle door.

In addition, according to embodiments of the present disclosure, the window regulator 8 may be directly mounted on an inner panel 1a of the vehicle door 1, and in this case, the door module 2 may be removed. When the door module 2 is removed, the controller 20 may be directly mounted on the inner panel 1a of the vehicle door 1. As illustrated in FIG. 8, an opening 1b may be formed in the inner panel 1a of the vehicle door 1, and the controller 20 may be mounted in the opening 1b of the inner panel 1a of the vehicle door 1 through a mounting plate 28. The mounting plate 28 may be made of a non-conductive material such as synthetic resin. Thus, the controller 20 may be disposed inwardly of the inner panel 1a, and be protected by the mounting plate 28.

The wireless power receiver 30 may receive power from the controller 20 wirelessly to apply the power to the electrodes 14 and 16 of the window glass 10.

As illustrated in FIG. 3, the wireless power receiver 30 may be connected to the bottom end of the window glass 10, and the wireless power receiver 30 may be disposed adjacent to the electrodes 14 and 16 of the window glass 10 so that the lengths of the lead wires 14a and 16a may be shortened.

Figure 9:
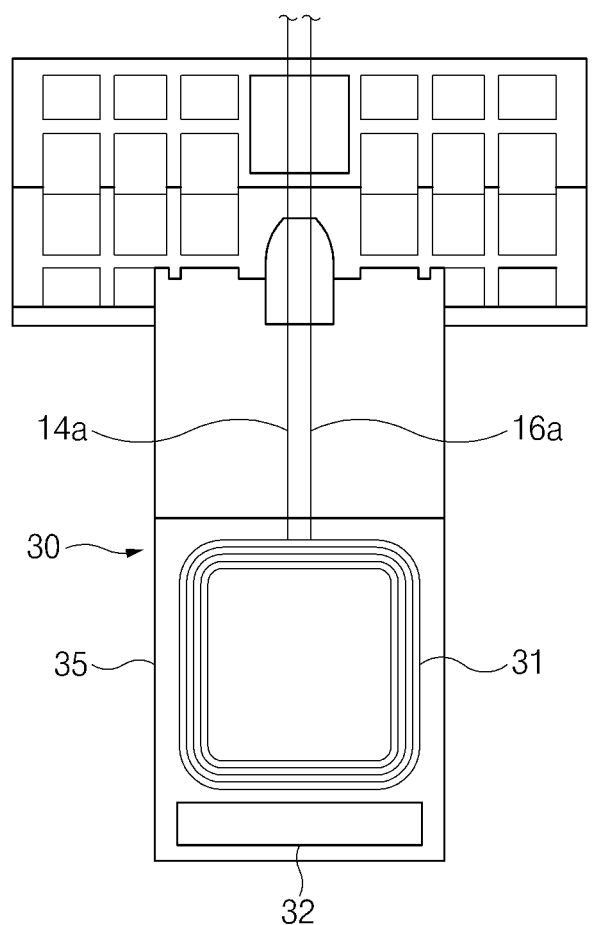
FIG. 9 illustrates a wireless power receiver in an apparatus for varying the transparency of a window glass according to embodiments of the present disclosure.
Figure 10:
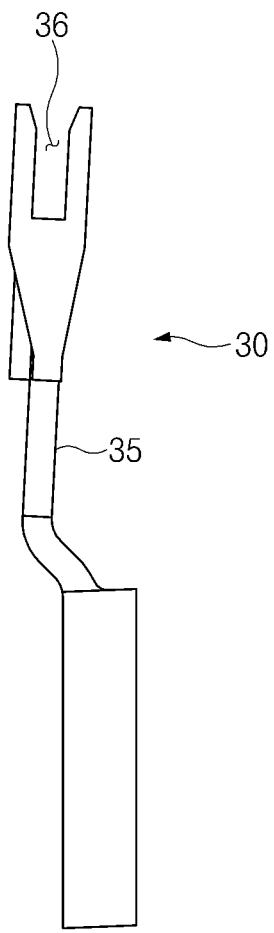
FIG. 10 illustrates a side view of a wireless power receiver in an apparatus for varying the transparency of a window glass according to embodiments of the present disclosure.

As illustrated in FIGS. 9 and 10, the wireless power receiver 30 may include a body 35, a receiving coil 31, and the glass position transmitter 32.

The body 35 may have a coupler 36 to which the bottom end of the window glass 10 is coupled. The receiving coil 31 and the glass position transmitter 32 may be arranged on the body 35.

The receiving coil 31 may receive power from the power transmission control module 23 wirelessly by electromagnetic induction.

The receiving coil 31 and the pair of electrodes 14 and 16 may be electrically connected through the pair of lead wires 14a and 16a, and a voltage may be transmitted from the receiving coil 31 to the electrodes 14 and 16 of the window glass 10 through the pair of lead wires 14a and 16a.

The glass position transmitter 32 may transmit the position of the window glass 10.

According to embodiments of the present disclosure, as the glass position transmitter 32 feeds the signal received from the power transmission control module 23 back to the power transmission control module 23, the power transmission control module 23 may detect the strength of the feedback signal to determine whether the window glass 10 is moved to the fully closed position (i.e., whether the window glass 10 is fully closed).

In addition, according to embodiments of the present disclosure, the power transmission control module 23 may receive information on the position of the window glass 10 from a controller of the window regulator 8 so that the power transmission control module 23 may determine whether the window glass 10 is moved to the fully closed position. When the information on the position of the window glass 10 is received from the controller of the window regulator 8 as described above, the glass position transmitter 32 may be removed.

Furthermore, according to embodiments of the present disclosure, a magnet (not shown) may be attached to one side of the window glass 10, and a hall sensor (not shown) may be attached to the vehicle door 1. The hall sensor may detect a magnetic field of the magnet to detect the position of the window glass 10. By using the hall sensor and the magnet, the power transmission control module 23 may determine whether the window glass 10 is moved to the fully closed position. When the position of the window glass 10 is detected by the hall sensor and the magnet as described above, the glass position transmitter 32 may be removed.

Figure 11:
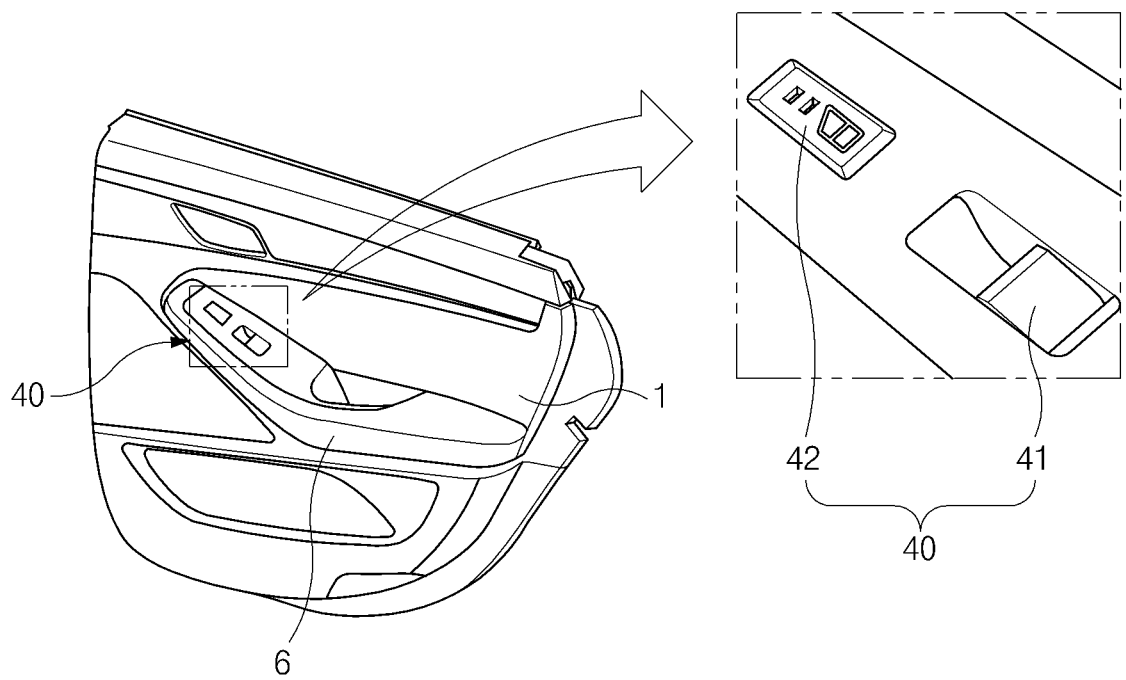
FIG. 11 illustrates a window manipulation device connected to an apparatus for varying the transparency of a window glass according to embodiments of the present disclosure.

As illustrated in FIG. 11, the window manipulation device 40 may be disposed on an armrest 6 of the vehicle door 1. The window manipulation device 40 may include an up/down manipulation button 41 for raising and lowering the window glass 10, and the transparency manipulation button 42 for adjusting the transparency of the window glass 10.

The first control signal indicating a variation in the transparency of the window glass 10 may be generated by operating the transparency manipulation button 42. The first control signal may be adjusted according to the degree of manipulation of the transparency manipulation button 42, and the first control signal may be transmitted to the power transmission control module 23. The transparency of the window glass 10 may be varied by the first control signal.

A second control signal indicating the raising and lowering of the window glass 10 may be generated by operating the up/down manipulation button 41, and the second control signal may be a control signal for raising and lowering the window glass 10. The second control signal may be adjusted according to the degree of manipulation of the up/down manipulation button 41, and the second control signal may be transmitted to the window regulator 8. The degree of raising and lowering the window glass 10 may be adjusted by the second control signal.

Referring to FIG. 12, the operation of the apparatus 100 for varying the transparency of a window glass according to embodiments of the present disclosure will be described in detail.

As a user operates the transparency manipulation button 42 of the window manipulation device 40, a transparency control signal may be transmitted to the power transmission control module 23.

The power transmission control module 23 may detect information on the position of the window glass 10 through the glass position transmitter 32 or the controller of the window regulator 8 to determine whether the window glass 10 is fully closed.

When the power transmission control module 23 determines that the window glass 10 is fully closed, the power transmission control module 23 may adjust an output power level of the AC inverter circuit 21 so that power corresponding to the transparency control signal may be transmitted from the battery 5 to the receiving coil 31.

The AC inverter circuit 21 may convert a DC power received from the battery 5 into an AC power to output the converted power signal to the transmitting coil 22. The power transmission control module 23 may control the AC power to be output from the AC inverter circuit 21 according to the transparency control signal.

AC power converted by the AC inverter circuit 21 may be transmitted from the AC inverter circuit 21 to the transmitting coil 22, and the transmitting coil 22 may transmit the AC power to the receiving coil 31 by electromagnetic induction. The receiving coil 31 may apply the AC voltage to the electrodes 14 and 16 of the window glass 10 through the lead wires 14a and 16a.

The AC voltage applied to the electrodes 14 and 16 of the window glass 10 may arrange molecules constituting the film 15 of the window glass 10 so that the state of the window glass 10 may be converted to a transparent state with a predetermined transmittance.

Figure 13:
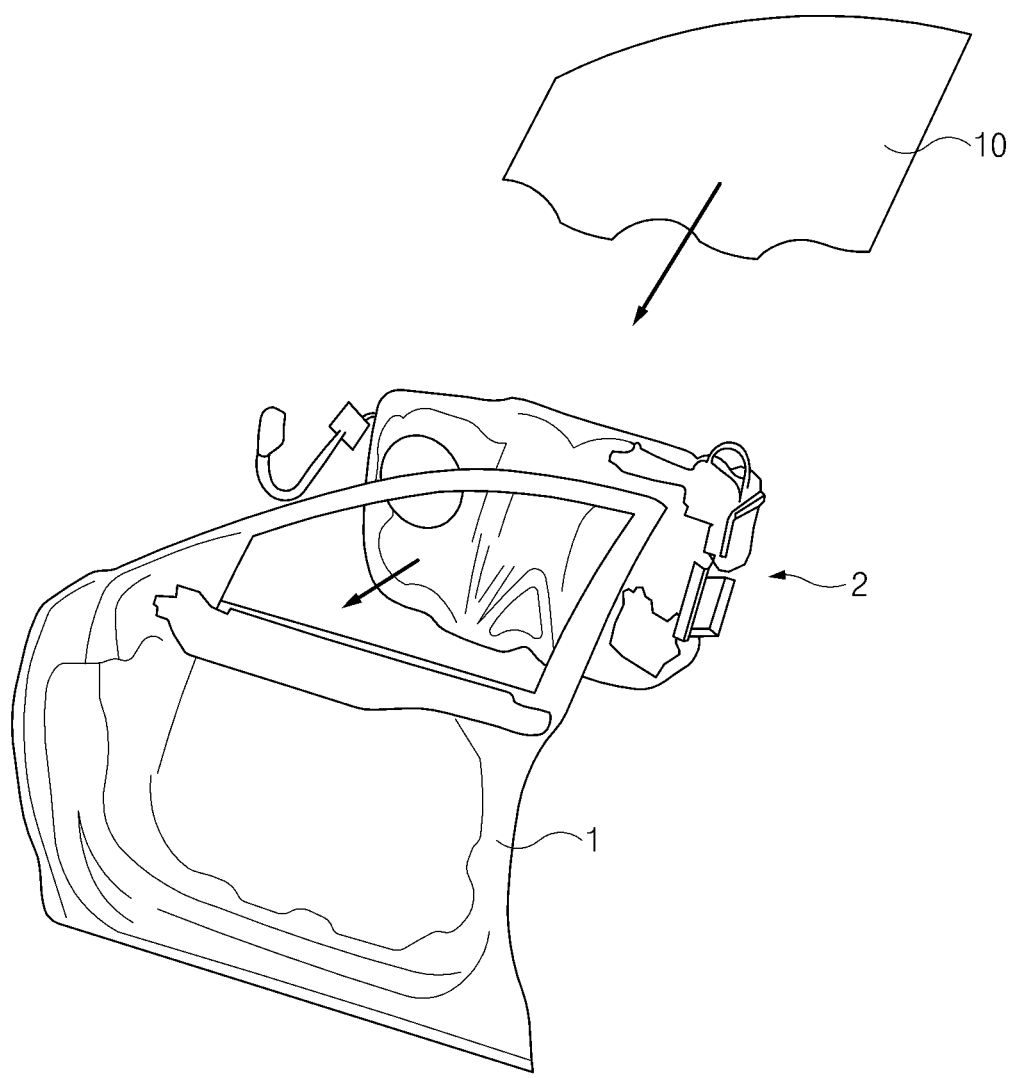
FIG. 13 illustrates a process of assembling a door module into a vehicle door.
Figure 14:
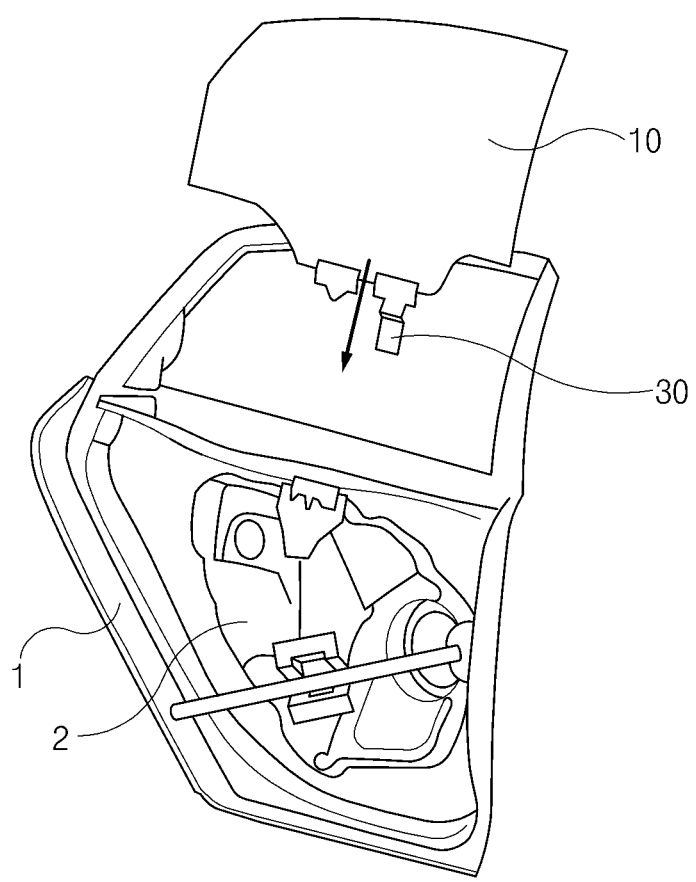
FIG. 14 illustrates a process of assembling a window glass into a door module.

FIGS. 13 and 14 illustrate an assembly process of the apparatus 100 for varying the transparency of a window glass according to embodiments of the present disclosure of the present disclosure.

As illustrated in FIG. 13, the door module 2 may be assembled to the vehicle door 1. The controller 20 may be assembled to the door module 2 before the door module 2 is assembled to the vehicle door 1 or after the door module 2 is assembled to the vehicle door 1.

Then, as illustrated in FIG. 14, the wireless power receiver 30 may be connected to the bottom end of the window glass 10, and the window glass 10 connected to the wireless power receiver 30 may be assembled to the door module 2.

As described above, as the transparency of the window glass is varied using wireless power transfer, the assembly of the apparatus 100 for varying the transparency of a window glass may be carried out more easily and quickly as compared to conventional assemblies.

As set forth above, the apparatus for varying the transparency of a window glass, according to embodiments of the present disclosure, may vary the transparency of the window glass using wireless power transfer, thereby preventing excessive noise, improving durability, simplifying assembly, facilitating the up and down movement of the window glass, and significantly reducing costs.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. An apparatus comprising:
a window glass having a film with variable transparency;
a pair of electrodes connected to the film;

a controller mounted on a vehicle door of a vehicle, the controller controlling a wireless transfer of power for adjusting the transparency of the film; and a wireless power receiver mounted on the window glass, the wireless power receiver wirelessly receiving the power from the controller, wherein the wireless power receiver applies the power wirelessly received from the controller to the pair of electrodes, wherein the controller includes an alternating current (AC) inverter circuit converting direct current (DC) power supplied from a battery into AC power required for power transmission, a transmitting coil wirelessly transmitting the power to the wireless power receiver by electromagnetic induction, and a power transmission control module adjusting an amplitude of AC voltage output from the AC inverter circuit according to the transparency control signal to thereby control the output power level of the AC inverter circuit.

2. The apparatus according to claim 1, wherein:

the window glass includes an outdoor glass layer facing an outside of the vehicle and an indoor glass layer facing an interior of the vehicle, and the film is disposed between the outdoor glass layer and the indoor glass layer.

3. The apparatus according to claim 2, wherein the outdoor glass layer and the indoor glass layer are attached to opposing surfaces of the film.

4. The apparatus according to claim 3, wherein the pair of electrodes are individually connected to the wireless power receiver through a pair of lead wires.

5. The apparatus according to claim 1, wherein the wireless power receiver is connected to a bottom end of the window glass.

6. The apparatus according to claim 5, wherein the wireless power receiver includes a receiving coil wirelessly receiving the power from the power transmission control module by electromagnetic induction.

7. The apparatus according to claim 6, wherein the receiving coil and the pair of electrodes are electrically connected through lead wires.

8. The apparatus according to claim 1, wherein the power transmission control module determines whether or not the window glass is closed.

9. The apparatus according to claim 8, wherein:

the wireless power receiver includes a glass position transmitter, and the glass position transmitter feeds a control signal received from the power transmission control module back to the power transmission control module.

10. The apparatus according to claim 8, wherein the power transmission control module determines whether or not the window glass is closed based on information indicating a position of the window glass received from a controller of a window regulator.

11. The apparatus according to claim 1, wherein the controller is connected to a window manipulation device having a transparency manipulation button.

* * * * *